(12) United States Patent
Alperovich et al.

(10) Patent No.: US 6,240,069 B1
(45) Date of Patent: May 29, 2001

(54) SYSTEM AND METHOD FOR LOCATION-BASED GROUP SERVICES

(75) Inventors: Vladimir Alperovich, Dallas; Dipankar Ray, Garland, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/097,903

(22) Filed: Jun. 16, 1998

(51) Int. Cl.[7] ..................................................... H04Q 11/00
(52) U.S. Cl. .......................... 370/260; 455/416; 455/445; 455/456; 455/518; 455/519
(58) Field of Search ..................................... 370/260, 261, 370/262, 263, 264, 265, 270, 328, 329, 331; 379/158, 201, 202, 203, 204, 205, 206; 455/414, 422, 440, 433, 456, 461, 517, 518, 519

(56) References Cited

U.S. PATENT DOCUMENTS

| 5,293,644 | | 3/1994 | Barry et al. ........................... 455/38.1 |
| 5,797,100 | * | 8/1998 | Dettner ................................. 455/518 |
| 5,943,619 | * | 8/1999 | Coyne et al. ......................... 455/433 |
| 5,953,400 | * | 9/1999 | Rosenthal et al. ................... 379/202 |
| 6,002,932 | * | 12/1999 | Kingdom et al. ..................... 455/433 |
| 6,006,097 | * | 12/1999 | Hornfeldt et al. .................... 455/456 |
| 6,097,942 | * | 8/2000 | Laiho ................................... 455/414 |

FOREIGN PATENT DOCUMENTS

WO 95/35001    12/1995  (WO) .

* cited by examiner

*Primary Examiner*—Hassan Kizou
*Assistant Examiner*—Inder Pal Mehra
(74) *Attorney, Agent, or Firm*—Jenkens & Gilchrist, P.C.

(57) ABSTRACT

A telecommunications system and method is disclosed for defining location-based group services, which can be implemented within a Group Call Services (GCS) node associated with a cellular network. When a group call is initiated, the GCS can send a positioning request to a Mobile Location Center (MLC) to locate the group members within a specified area. The particular location can be defined by the group number or the location can be prompted by the GCS. For each group member, the position of a mobile terminal associated with that group member is determined and the call is set up only to those members which the meet the specified area criteria. If none can be located within the specified area, the area can be expanded at the callers request.

26 Claims, 3 Drawing Sheets

SYSTEM AND METHOD FOR LOCATION-BASED GROUP SERVICES

BACKGROUND OF THE PRESENT INVENTION

1. Field of the Invention

The present invention relates generally to telecommunications systems and methods for establishing a group call to mobile subscribers within a group, and specifically to establishing a group call to those mobile subscribers within the group that are within a particular area.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as wireless network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from its home HLR database 26 (simultaneously informing the HLR 26 about the current location of the MS 20). Accordingly, if the user of the MS 20 then wants to make a call, the local VLR 16 will have the requisite identification information without having to reinterrogate the home HLR 26. In the aforedescribed manner, the VLR and HLR databases 16 and 26, respectively, contain various subscriber information associated with a given MS 20.

Currently, additional subscriber services can be provided by adding an overlay to an existing cellular network 10. One such service is a group call, which utilizes a group call services (GCS) node (not shown) to set up the group calls. A member of the group can dial a specific number associated with the group, which triggers the MSC/VLR 14/16 to route the call to the GCS. The GCS can then set up a call to each member of the group and tie the calls together in a manner similar to a conference call.

Conventionally, the GCS sets up a call to all group members regardless of their location. This can lead to a group conference in which the members are dispersed over a large area, which can be a disadvantage in the situation where the initiator of the group call needs to reach only members of the group within a certain area. For example, if the group is a service company and the initiator of the group call needs to get in touch with members of the group who are located near a required service area, the initiator of the group call may prefer to only set up a call to those group members close to the service area in order to facilitate a quicker response time to the problem and to avoid interrupting those group members not able to reach the desired service area.

It is, therefore, an object of the present invention to define and implement location-based group services within a cellular network.

SUMMARY OF THE INVENTION

The present invention is directed to telecommunications systems and methods for defining location-based group services, which can be implemented within a Group Call Services (GCS) node associated with a cellular network. When a group call is initiated, the GCS can send a positioning request to a Mobile Location Center (MLC), requesting the MLC to locate the group members within a specified area. The specified area can be defined by the group number or the location can be prompted by the GCS. For each group member, the position of the mobile terminal associated with that group member is determined, and the call is set up only to those members which meet the specified area criteria. If none can be located within the specified area, the area can be expanded at the callers request.

BRIEF DESCRIPTION OF THE DRAWINGS

The disclosed inventions will be described with reference to the accompanying drawings, which show sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
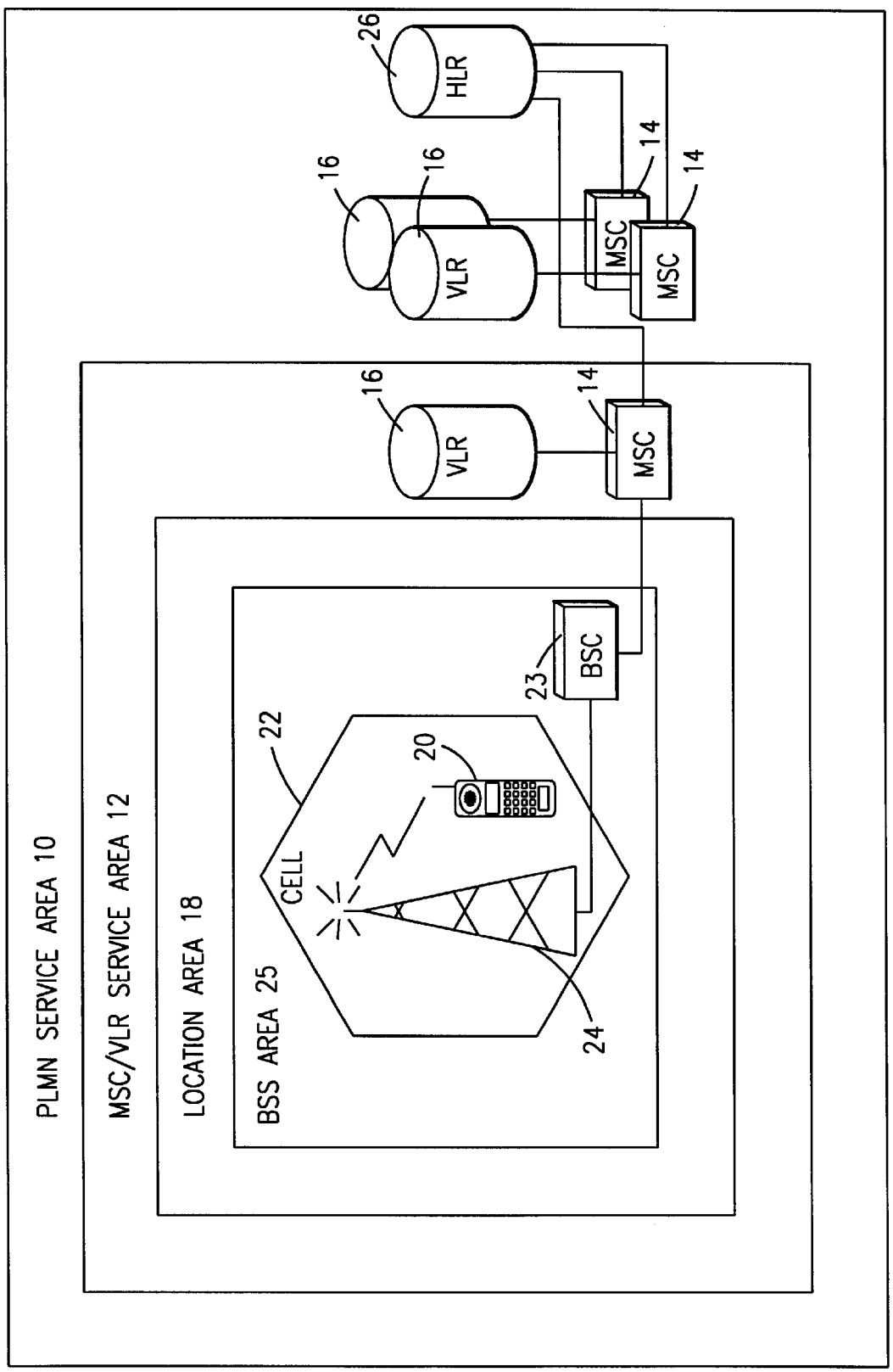
FIG. 1 is a block diagram of a conventional terrestrially-based wireless telecommunications system.
Figure 2:
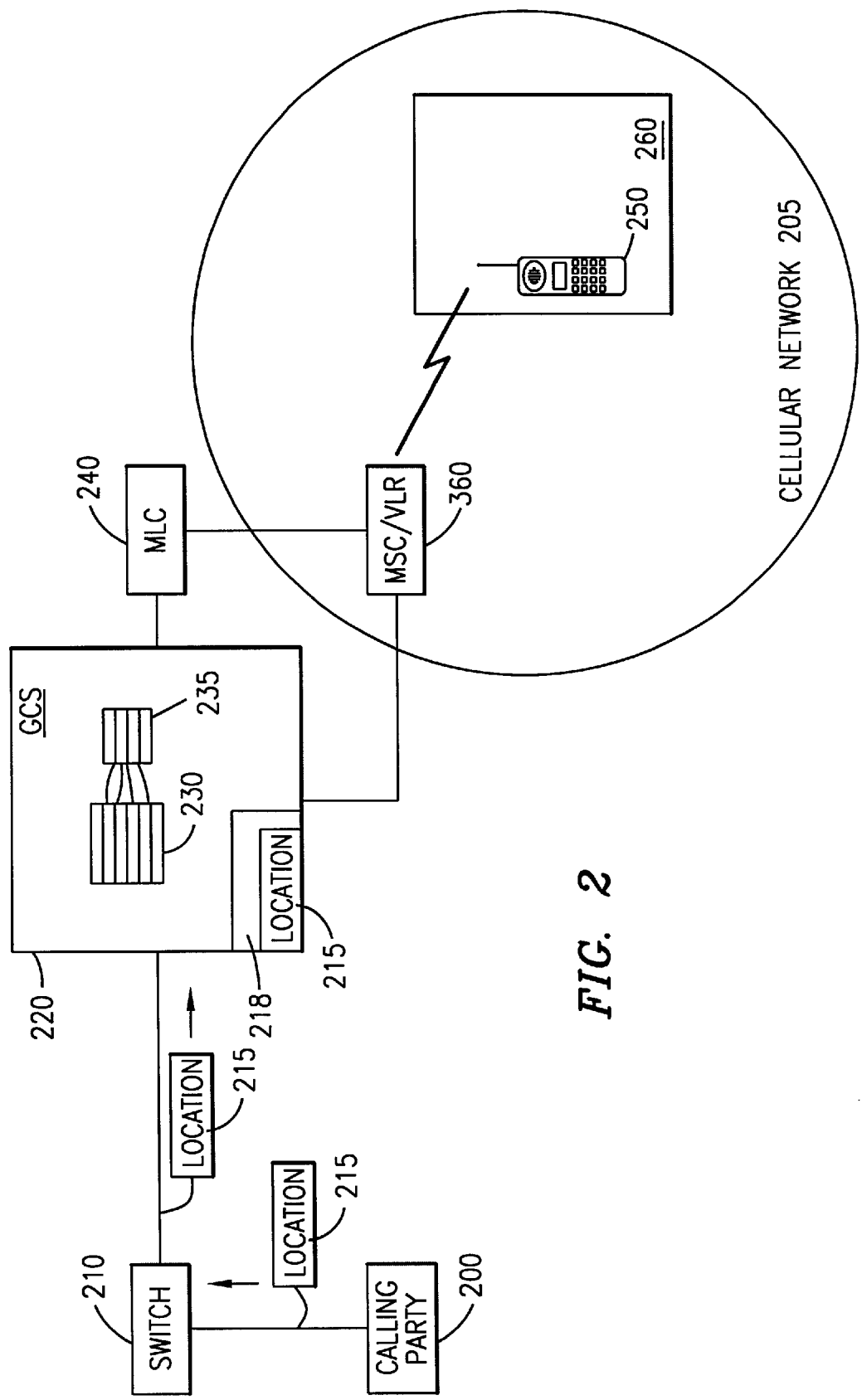
FIG. 2 illustrates a group call to members of a group within a specified area in accordance with preferred embodiments of the present invention.

With reference now to FIG. 2 of the drawings, a call to a specified group of subscribers can be tailored such that the call is placed only to those subscribers within the group that are located within a certain area 260 by defining a location-based group 235 in a Group Call Services (GCS) node 220. A calling party 200 can place a call to a group of subscribers 230 by dialing a number associated with the group 230. Thereafter, the number is analyzed by a switch 210 associated with the calling party 200 and the call is routed to the GCS node 220. It should be noted that the calling party 200 can be within the Public Switched Telephone Network or within a cellular network 205, the former being illustrated.

The GCS node 220 can then either prompt the calling party 200 for a location code 215, which can be defined by the calling party, or provide a list of locations for the calling party to select from. The list of locations can be based upon select coordinates, ranges of coordinates, predefined location areas (either defined by the cellular network 205 or the calling party 200), or other location designations. Alternatively, the group number the calling party 200 dialed can have a location 215 associated with it. Once the calling party 200 enters the desired location 215, it is sent to the GCS 220 and stored in a memory 218 therein. The GCS 220 then cooperates with a Mobile Location Center (MLC) 240 to locate Mobile Stations (MSs) 250 associated with the group members that are within the area 260 closest to the specified location 215. It should be noted that the MLC 240 can be a stand-alone node or part of the GCS 220 itself.

Figure 3:
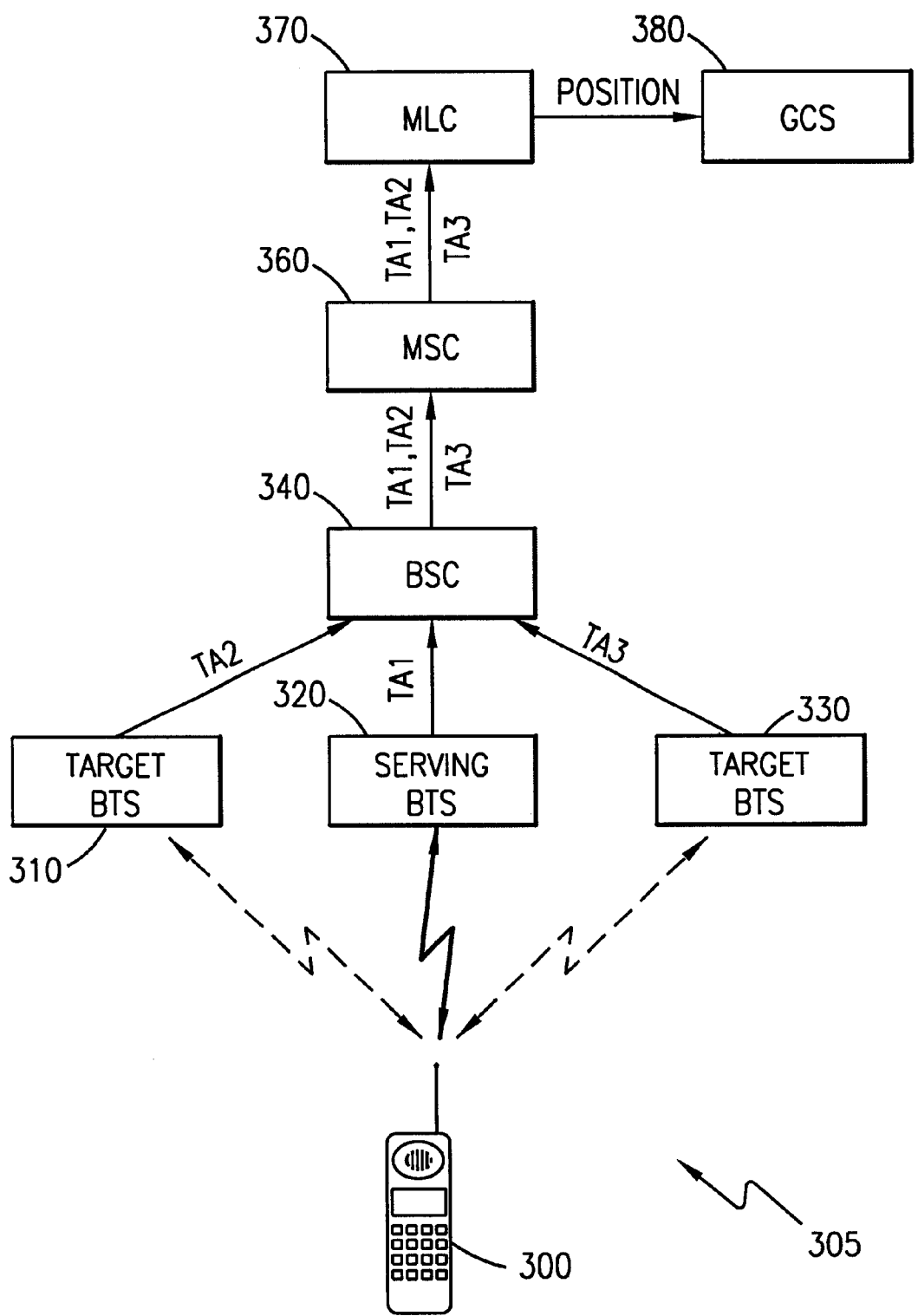
FIG. 3 is a block diagram showing the determination of the location of a mobile terminal within a cellular network.

As can be seen in FIG. 3 of the drawings, when the GCS node 380 sends a positioning request for each MS 300 within the group to the MLC 370, a Base Station System (BSS) (320 and 340) serving one of the MSs 300 to be positioned generates positioning data for that MS 300. For Global System for Mobile Communications (GSM) networks, this positioning data typically consists of, for example, a Timing Advance (TA) value from three or more separate Base Transceiver Stations (BTSs) (310, 320, and 330). Each TA value corresponds to the amount of time in advance that the MS 300 must send a message in order for a BTS 320 to receive it in the time slot allocated to that MS 300. When a message is sent from the MS 300 to the BTS 320, there is a propagation delay, which depends upon the distance between the MS 300 and the BTS 320. TA values are expressed in bit periods, and can range from 0 to 63, with each bit period corresponding to approximately 550 meters between the MS 300 and the BTS 320.

Once a TA value is determined for one BTS 320, the distance between the MS 300 and that particular BTS 320 is known, but the actual location is not. If, for example, the TA value equals one, the MS 300 could be anywhere along a radius of 550 meters. Two TA values from two BTSs, for example, BTSs 310 and 320, provide two possible points that the MS 200 could be located (where the two radiuses intersect). However, with three TA values from three BTSs, e.g., BTSs 310, 320, and 330, the location of the MS 300 can be determined with a certain degree of accuracy.

This positioning data is then delivered to a Mobile Switching Center (MSC) 360 serving the area that the MS 300 is located in. Subsequently, this positioning data is forwarded to the MLC 370 for calculation of the geographical location of that MS 300. Using a triangulation algorithm, with knowledge of the three TA values and site location data associated with each BTS (310, 320, and 330), the position of the MS 300 can be determined (with certain accuracy) by the MLC 370.

It should be understood, however, that any estimate of time, distance, or angle for any cellular system 305 can be used, instead of the TA value discussed herein. For example, the MS 300 can have a Global Positioning System (GPS) receiver built into it, which is used to determine the location of the MS 300. In addition, the MS 300 can collect positioning data based on the Observed Time Difference (OTD) between the time a BTS 320 sends out a signal and the time the MS 300 receives the signal. This time difference information can be sent to the MLC 370 for calculation of the location of the MS 300. Alternatively, the MS 300, with knowledge of the location of the BTS 320, can determine its own location.

With reference again to FIG. 2 of the drawings, the location of each of the MSs 250 within the group can then be sent back to the GCS node 220 for comparison with the requested location 215. The GCS node 220 can then define the location-based group 235 from the original group of subscribers 230, and set up a group call to those subscribers within the area 260 associated with the specified location 215. However, if no subscribers are within the area 260 associated with the specified location 215, the location area 215 defined by the calling party 200 can be expanded at the calling party's 200 request.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for establishing a group call to at least one mobile terminal located within a specified area within a cellular network, said telecommunications system comprising:

a group call services node having a list of subscribers stored therein, said list of subscribers being associated with said group call, said at least one mobile terminal being associated with one of said subscribers on said list of subscribers, said group call services node receiving said group call and location information associated with said specified area;

a mobile location node connected to said group call services node, said mobile location node determining the location of said at least one mobile terminal and sending the location of said at least one mobile terminal to said group call services node, said group call services node comparing the location of said at least one mobile terminal with said location information; and a mobile switching center in wireless communication with said at least one mobile terminal and connected to said group call services node, said mobile switching center connecting said group call between said group call services node and said at least one mobile terminal when the location of said at least one mobile terminal is substantially identical to said location information.

2. The telecommunications system of claim 1, wherein said group call services node receives said group call from a calling party, said calling party dialing a number associated with said list of subscribers to place said group call.

3. The telecommunications system of claim 2, wherein said location information is stored within said group call services node, said location information being associated with said number said calling party dials.

4. The telecommunications system of claim 2, wherein said group call services node prompts said calling party to enter a location code, said location code being associated with said location information.

5. The telecommunications system of claim 2, wherein said group call services node provides a list of locations to said calling party, said calling party sending a selected location from said list of locations to said group call services node, said selected location being associated with said location information.

6. The telecommunications system of claim 1, wherein said location information is selected from the group consisting of: coordinates, a range of coordinates, a cellular location area, or a group-defined location area.

7. The telecommunications system of claim 1, wherein said group call services node sends a plurality of positioning requests to said mobile location node, each said positioning request being associated with one of said subscribers within said list of subscribers, said mobile location node determining the location of a plurality of mobile terminals, each said mobile terminal being associated with one said subscribers, said at least one mobile terminal being within said plurality of mobile terminals.

8. The telecommunications system of claim 7, wherein said group call services node determines a location-based group from said list of subscribers, said location-based group comprising said subscribers associated with mobile terminals located substantially within said specified area, said group call being established to each said mobile terminal associated with one of said subscribers within said location-based group.

9. The telecommunications system of claim 1, wherein said mobile location node determines the location of said at least one mobile terminal using positioning data obtained from said mobile switching center.

10. A method for establishing a group call to at least one mobile terminal located within a specified area within a cellular network, said method comprising the steps of:
   receiving, by a group call services node, said group call and location information associated with said specified area, said group call services node having a list of subscribers stored therein, said list of subscribers being associated with said group call, said at least one mobile terminal being associated with one of said subscribers on said list of subscribers;
   determining, by a mobile location node connected to said group call services node, the location of said at least one mobile terminal;
   sending, by said mobile location node, the location of said at least one mobile terminal to said group call services node;
   comparing, by said group call services node, the location of said at least one mobile terminal with said location information; and
   connecting, by a mobile switching center in wireless communication with said at least one mobile terminal and connected to said group call services node, said group call between said group call services node and said at least one mobile terminal when the location of said at least one mobile terminal is substantially identical to said location information.

11. The method of claim 10, wherein said step of receiving is performed by said group call services node receiving said group call from a calling party, and further comprising, before said step of receiving, the step of:
   dialing, by said calling party, a number associated with said list of subscribers to place said group call.

12. The method of claim 11, wherein said step of receiving said location information is performed by storing said location information within said group call services node, said location information being associated with said number said calling party dials.

13. The method of claim 11, wherein said step of receiving said location information is performed by said group call services node prompting said calling party to enter a location code, said location code being associated with said location information.

14. The method of claim 11, wherein said step of receiving said location information is performed by said group call services node providing a list of locations to said calling party, said calling party sending a selected location from said list of locations to said group call services node, said selected location being associated with said location information.

15. The method of claim 10, wherein said location information is selected from the group consisting of: coordinates, a range of coordinates, a cellular location area, or a group-defined location area.

16. The method of claim 10, further comprising, before said step of determining, the step of:
   sending, by said group call services node, a plurality of positioning requests to said mobile location node, each said positioning request being associated with one of said subscribers within said list of subscribers, said step of determining being performed by said mobile location node determining the location of a plurality of mobile terminals, each said mobile terminal being associated with one said subscribers, said at least one mobile terminal being within said plurality of mobile terminals.

17. The method of claim 16, further comprising, before said step of connecting, the step of:
   determining, by said group call services node, a location-based group from said list of subscribers, said location-based group comprising said subscribers associated with mobile terminals located substantially within said specified area, said group call being established to each said mobile terminal associated with one of said subscribers within said location-based group.

18. The method of claim 10, wherein said step of determining is performed by said mobile location node using positioning data obtained from said mobile switching center.

19. A group call services node for establishing a group call to at least one mobile terminal within a specified area within a cellular network, said group call services node comprising:
   a database comprising a list of subscribers, said list of subscribers being associated with said group call, said at least one mobile terminal being associated with one of said subscribers on said list of subscribers;
   receiving means for receiving said group call and location information associated with said specified area;
   sending means for sending a positioning request to locate said at least one mobile terminal to a mobile location node connected to said group call services node, said mobile location node determining the location of said at least one mobile terminal and sending the location of said at least one mobile terminal to said group call services node; and comparison means for comparing the location of said at least one mobile terminal with said location information, said group call services node establishing said group call to said at least one mobile terminal when the location of said at least one mobile terminal is substantially identical to said location information.

20. The group call services node of claim 19, wherein said receiving means receives said group call from a calling party, said calling party dialing a number associated with said list of subscribers to place said group call.

21. The group call services node of claim 20, wherein said location information is stored within a memory within said group call services node, said location information being associated with said number said calling party dials.

22. The group call services node of claim 20, wherein said receiving means receives a location code from said calling party, said location code being associated with said location information.

23. The group call services node of claim 20, wherein said receiving means receives a selected location from a list of locations provided to said calling party by said group call services node, said selected location being associated with said location information.

24. The group call services node of claim 19, wherein said location information is selected from the group consisting of: coordinates, a range of coordinates, a cellular location area, or a group-defined location area.

25. The group call services node of claim 19, wherein said sending means sends a plurality of positioning requests to said mobile location node, each said positioning request being associated with one of said subscribers within said list of subscribers, said mobile location node determining the location of a plurality of mobile terminals, each said mobile terminal being associated with one said subscribers, said at least one mobile terminal being within said plurality of mobile terminals.

26. The group call services node of claim 25, further comprising determining means for determining a location-based group from said list of subscribers, said location-based group comprising said subscribers associated with mobile terminals located substantially within said specified area, said group call being established to each said mobile terminal associated with one of said subscribers within said location-based group.

* * * * *